(12) United States Patent
Choi et al.

(10) Patent No.: US 11,784,314 B2
(45) Date of Patent: Oct. 10, 2023

(54) NEGATIVE ELECTRODE FOR LITHIUM SECONDARY BATTERY AND LITHIUM SECONDARY BATTERY INCLUDING THE SAME

(71) Applicant: LG CHEM, LTD., Seoul (KR)

(72) Inventors: Hee Won Choi, Daejeon (KR); Sang Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 386 days.

(21) Appl. No.: 16/973,617

(22) PCT Filed: Aug. 12, 2019

(86) PCT No.: PCT/KR2019/010235
§ 371 (c)(1),
(2) Date: Dec. 9, 2020

(87) PCT Pub. No.: WO2020/036392
PCT Pub. Date: Feb. 20, 2020

(65) Prior Publication Data
US 2021/0167398 A1    Jun. 3, 2021

(30) Foreign Application Priority Data
Aug. 13, 2018   (KR) .................. 10-2018-0094539

(51) Int. Cl.
| | | |
|---|---|---|
| H01M 4/66 | (2006.01) | |
| H01M 4/133 | (2010.01) | |
| H01M 4/36 | (2006.01) | |
| H01M 10/0525 | (2010.01) | |
| H01M 4/02 | (2006.01) | |

(52) U.S. Cl.
CPC ........... *H01M 4/661* (2013.01); *H01M 4/133* (2013.01); *H01M 4/366* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | |
|---|---|---|
| 2005/0206314 A1 | 12/2005 | Sheem et al. |
| 2010/0273050 A1 | 10/2010 | Sheem et al. |
| 2012/0094175 A1 | 4/2012 | Sheem et al. |
| 2015/0079477 A1 | 3/2015 | Spahr et al. |
| 2015/0207177 A1 | 7/2015 | Ose et al. |
| 2016/0276657 A1 | 9/2016 | Song et al. |
| 2016/0322636 A1* | 11/2016 | Lee .................. H01M 4/133 |
| 2017/0133682 A1 | 5/2017 | Kang et al. |
| 2017/0179487 A1 | 6/2017 | Takeda et al. |
| 2018/0175376 A1 | 6/2018 | Chae et al. |
| 2018/0190975 A1 | 7/2018 | Ishii et al. |
| 2018/0190985 A1 | 7/2018 | Choi et al. |
| 2019/0376209 A1* | 12/2019 | Kisailus ............. H01M 4/587 |
| 2020/0119336 A1* | 4/2020 | Shinomiya .......... H01M 4/133 |
| 2021/0143425 A1* | 5/2021 | An .................... H01M 4/587 |

FOREIGN PATENT DOCUMENTS

| | | |
|---|---|---|
| CN | 104471779 A | 3/2015 |
| CN | 105794027 A | 7/2016 |
| CN | 105917501 A | 8/2016 |
| CN | 107710467 A | 2/2018 |
| CN | 107851795 A | 3/2018 |
| EP | 3297073 A1 | 3/2018 |
| EP | 3319154 A1 | 5/2018 |
| JP | 2003-272627 A | 9/2003 |
| JP | 4470467 B2 | 6/2010 |
| JP | 2017-174739 A | 4/2017 |
| KR | 10-2005-0100505 A | 10/2005 |
| KR | 10-0853888 B1 | 8/2008 |
| KR | 10-2015-0031288 A | 3/2015 |
| KR | 10-1505218 B1 | 3/2015 |
| KR | 10-2015-0059135 A | 5/2015 |
| KR | 10-2017-0037597 A | 4/2017 |
| KR | 10-2017-0048210 A | 5/2017 |
| KR | 10-2017-0053123 A | 5/2017 |
| KR | 10-2017-0055429 A | 5/2017 |
| KR | 10-1746272 B1 | 6/2017 |
| KR | 10-2017-0075661 A | 7/2017 |
| WO | WO 2017/082680 A1 | 5/2017 |

OTHER PUBLICATIONS

International Search Report (PCT/ISA/210) issued in PCT/KR2019/010235 dated Nov. 22, 2019.
Extended European Search Report for European Application No. 19850516.6, dated May 27, 2021.
Raghu et al., "Electrochemical behaviour of titanium/iridium(IV) oxide: Tantalum pentoxide and graphite for application in vanadium redox flow battery," Journal of Power Sources, vol. 238, 2013 (available online Mar. 26, 2013), pp. 103-108.

* cited by examiner

*Primary Examiner* — Wyatt P McConnell
(74) *Attorney, Agent, or Firm* — Birch, Stewart, Kolasch & Birch, LLP

(57) ABSTRACT

A negative electrode for a lithium secondary battery including a negative electrode current collector and a negative electrode active material layer formed on at least one surface of the negative electrode current collector. The negative electrode active material layer includes a negative electrode active material including artificial graphite particles, and the negative electrode has a pore resistance $R_p$ of 6Ω or less.

11 Claims, No Drawings

NEGATIVE ELECTRODE FOR LITHIUM SECONDARY BATTERY AND LITHIUM SECONDARY BATTERY INCLUDING THE SAME

CROSS-REFERENCE TO RELATED APPLICATION

This application claims priority to and the benefit of Korean Patent Application No. 10-2018-0094539, filed on Aug. 13, 2018, the disclosure of which is incorporated herein by reference in its entirety.

TECHNICAL FIELD

The present invention relates to a negative electrode for a lithium secondary battery and a lithium secondary battery.

BACKGROUND ART

As the price for energy sources increases due to the depletion of fossil fuels and interest in environmental pollution is amplified, environmentally friendly alternative energy sources have become an essential factor for future life.

In particular, as the technical development of and the demand for mobile devices increase, the demand for secondary batteries as an environmentally-friendly alternative energy source is rapidly increasing.

In addition, as interest in environmental problems has recently increased, research on electric vehicles (EVs), hybrid electric vehicles (HEVs), and the like that can replace vehicles using fossil fuels, such as gasoline vehicles, diesel vehicles, and the like which are one of the major causes of air pollution, is actively conducted. As a power source for such EVs and HEVs, lithium secondary batteries having a high energy density, a high discharge voltage, and output stability have been mainly studied and used.

In general, lithium secondary batteries include a positive electrode, a negative electrode, and an electrolyte, and the positive electrode and the negative electrode include a positive electrode active material and a negative electrode active material, respectively. In the lithium secondary batteries, energy transfer occurs while lithium ions reciprocate between the positive electrode and the negative electrode such that, through 1st charging, the lithium ions from the positive electrode active material are intercalated into the negative electrode active material such as a carbon-based material (for example, graphite and the like) and, during discharging, the lithium ions are deintercalated, and, in this way, the lithium secondary batteries can be charged and discharged.

As the object using the above-described lithium secondary battery is enlarged, it is required to shorten a charging time to improve the convenience of the battery, and thus rapid charging characteristics are required.

Meanwhile, when a battery is charged at a high charge rate for rapid charging, there may be a problem that an electrochemical reaction occurs rapidly so that side reactions are intensified and lithium may be precipitated on the surface of a negative electrode, thereby reducing the lifespan characteristics and capacity of the battery.

Korea Registered Patent No. 10-1505218 discloses a lithium-ion secondary battery but did not provide an alternative to the above-described problem.

PRIOR ART DOCUMENT

[Patent Document]
Korea Registered Patent No. 10-1505218

DISCLOSURE

Technical Problem

The present invention is directed to providing a negative electrode for a lithium secondary battery in which rapid charging performance and lifespan characteristics are simultaneously improved.

The present invention is also directed to providing a lithium secondary battery including the above-described negative electrode for a lithium secondary battery.

Technical Solution

One aspect of the present invention provides a negative electrode for a lithium secondary battery including a negative electrode current collector, and a negative electrode active material layer formed on at least one surface of the negative electrode current collector, wherein the negative electrode active material layer comprises a negative electrode active material including an artificial graphite particle, and having a pore resistance of the negative electrode, $R_p$ of 6Ω or less.

Another aspect of the present invention provides a lithium secondary battery including the above-described negative electrode for a lithium secondary battery.

Advantageous Effects

A negative electrode for a lithium secondary battery of the present invention has a pore resistance ($R_p$) value in a specific range, and the negative electrode for a lithium secondary battery satisfying the above-described range can improve rapid charging performance by minimizing a diffusion path of lithium ions, and simultaneously can improve lifespan characteristics by effectively preventing a Li-plating problem during rapid charging.

MODES OF THE INVENTION

The terms and words used in the present specification and claims should not be construed as limited to general or dictionary terms and should be interpreted with the meaning and concept in accordance with the technical idea of the present invention based on the technical spirit that the inventors have appropriately defined the concepts of terms in order to explain the invention in the best way.

The terms used in the present specification are only used to describe specific various embodiments and are not intended to limit the present invention. As used herein, singular forms are intended to include plural forms as well, unless the context clearly indicates otherwise.

It should be understood that the terms "comprises," "comprising," "includes," "including," "contains," "containing," "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

In the present specification, an average particle size ($D_{50}$) may be defined as a particle size corresponding to 50% in a cumulative volume-based particle size distribution curve. The average particle size ($D_{50}$) may be measured using a laser diffraction method. The laser diffraction method may be used to measure a particle size in the range from submicrons to several micrometers, and may obtain results with high reproducibility and high resolution.

Hereinafter, the present invention will be described in detail.

Negative Electrode for Lithium Secondary Battery

The present invention relates to a negative electrode for a lithium secondary battery, and specifically, the negative electrode for a lithium secondary battery includes a negative electrode current collector and a negative electrode active material layer formed on the negative electrode current collector and including a negative electrode active material for a lithium secondary battery including artificial graphite particles, and has a pore resistance $R_p$ of 6Ω or less.

The negative electrode for a lithium secondary battery may have a pore resistance $R_p$ of 6Ω or less, preferably 3Ω to 6Ω, and more preferably 4Ω to 5.5Ω.

The pore resistance may be defined as a resistance value obtained by performing electrochemical impedance spectroscopy (EIS) after injecting an electrolyte solution including lithium ions into a symmetric cell manufactured by commonly using the negative electrode for a lithium secondary battery as a working electrode and a counter electrode. Since the pore resistance is analyzed with the symmetric cell through EIS, only lithium ions derived from the electrolyte solution may be present, and thus lithium-ion diffusion resistance in the negative electrode may be objectively measured.

Since the negative electrode for a lithium secondary battery has the above-described range of pore resistance, a lithium-ion diffusion path in the negative electrode may be minimized, and thus the rapid charging performance of the battery may be improved. In addition, since the lithium-ion diffusion path may be minimized when the pore resistance is in the above-described range, a Li-plating problem on the surface of the negative electrode, which may occur in high-rate charging, may be effectively prevented, and side reactions on the surface of the negative electrode may be prevented. Accordingly, the negative electrode for a lithium secondary battery of the present invention having the above-described range of pore resistance may have capacity characteristics and cycle characteristics improved to an excellent level.

It is not preferable that the pore resistance exceeds 6Ω, because the lithium-ion diffusion path in the negative electrode may be long and thus Li-plating may be intensified during high-rate charging, and the lifespan characteristics of the battery may be degraded.

The above-described range of pore resistance may be adjusted, for example, by controlling the hardness, structure, size, or the like of a negative electrode active material for a lithium secondary battery.

The negative electrode for a lithium secondary battery includes a negative electrode current collector and a negative electrode active material layer.

A negative electrode current collector generally used in the art may be used without limitation as the above-described negative electrode current collector, and for example, a negative electrode current collector is not particularly limited as long as it does not cause chemical changes in a lithium secondary battery and has high conductivity. For example, as the negative electrode current collector, copper, stainless steel, aluminum, nickel, titanium, calcined carbon, aluminum or stainless steel whose surface has been treated with carbon, nickel, titanium, silver, or the like, an aluminum-cadmium alloy, or the like may be used.

In addition, the negative electrode current collector may have fine irregularities formed on a surface thereof to increase the binding force of the negative electrode active material and may be used in various forms such as a film, a sheet, a foil, a net, a porous body, a foamed body, non-woven fabric, and the like.

The negative electrode current collector may generally have a thickness of 3 μm to 500 μm.

The negative electrode active material layer is formed on the negative electrode current collector.

The negative electrode active material layer includes a negative electrode active material for a lithium secondary battery, and the negative electrode active material for a lithium secondary battery includes artificial graphite particles.

The artificial graphite particles may have excellent charge/discharge characteristics in comparison with natural graphite and may have an excellent charge rate.

The artificial graphite particles may be artificial graphite particles having a hardness of 46 MPa or more, specifically 46 MPa to 70 MPa, more specifically 50 MPa to 65 MPa, and even more specifically 55 MPa to 62 MPa. Since the artificial graphite particles have a high hardness in the range described above, a structural change in the negative electrode is minimized when the negative electrode active material layer is rolled, and pores between the artificial graphite particles are maintained so that the diffusion of lithium ions may be easily achieved during charging to improve the rapid charging performance of the battery, and the diffusion path of lithium ions is properly secured to achieve the above-described range of pore resistance of the present invention.

The above-described range of hardness may be realized by a method of forming a carbon coating layer on artificial graphite particles, a method of preparing artificial graphite particles in the form of secondary particles formed by agglomerating primary particles, a method of preparing the primary particles through powdering and then agglomerating the primary particles into the secondary particles, a method of controlling the type of a precursor (for example, needle cokes or the like) used in the preparation of the artificial graphite particles, or the like, but the present invention is not limited thereto.

The hardness may be measured, for example, using a hardness measuring device such as a powder resistivity meter.

The artificial graphite particle may be a secondary artificial graphite particle formed by agglomerating two or more primary artificial graphite particles. The artificial graphite particle may be a secondary artificial graphite particle formed by assembling two or more primary artificial graphite particles.

When the artificial graphite particle is a secondary artificial graphite particle composed of an agglomerate of primary artificial graphite particles, a first pore may be present inside the secondary artificial graphite particle. The first pore may be an empty space between the primary artificial graphite particles and may be amorphous, and two or more thereof may be present. The first pore may have various forms, for example, may extend to the surface of the secondary artificial graphite particle to be exposed to the outside, or may be present only inside the secondary artificial graphite particle.

The primary artificial graphite particle may be formed after powdering a carbon precursor. Specifically, the primary artificial graphite particle may be formed by powdering a carbon precursor, filling the powder in a device, and heating the device to 500° C. to 3,000° C., and preferably 1,500° C. to 2,500° C. The carbon precursor may be one or more selected from the group consisting of coal-based heavy oil, fiber-based heavy oil, tars, pitches, and cokes. The primary artificial graphite particle having a high hardness may be preferably formed with the primary artificial graphite particle formed of the powdered carbon precursor because powders may be more easily aggregated.

When the artificial graphite particle is a secondary artificial graphite particle formed by agglomerating or assembling two or more primary artificial graphite particles, the secondary artificial graphite particle may be formed by agglomerating or assembling the primary artificial graphite particles by a centrifugal force applied when the primary artificial graphite particles are put into a reactor and then the reactor is operated, that is, when the primary artificial graphite particles are spun. In the agglomerating or assembling process of the primary artificial graphite particles, in addition to the primary artificial graphite particles, a pitch, a resin binder, and the like may also be put into the reactor and subjected to a heat treatment at about 1,400° C. to 1,600° C. After the secondary artificial graphite particle formed by agglomerating the primary artificial graphite particles is obtained, the secondary artificial graphite particle may be further subjected to a heat-treatment process. Since the heat-treatment process allows the primary artificial graphite particles to be combined or rearranged, the microstructure of the secondary artificial graphite particle may be improved.

In addition to the advantages described above, the artificial graphite particles may have a high theoretical capacity, and for example, the theoretical capacity of the artificial graphite particles may be greater than or equal to 350 mAh/g, and preferably greater than or equal to 372 mAh/g.

The negative electrode active material for a lithium secondary battery may further include a carbon coating layer formed on the artificial graphite particles.

The carbon coating layer may facilitate the entry and exit of lithium ions into the artificial graphite particles or lower the diffusion resistance of lithium ions to contribute to improving rapid charging performance. In addition, the carbon coating layer may improve the hardness of an active material to improve the structural stability of the active material and minimize the structural change during rolling. In addition, the presence of the carbon coating layer may contribute to achieving the above-described range of pore resistance.

The carbon coating layer may include amorphous carbon, and more specifically, may include at least one selected from the group consisting of soft carbon and hard carbon, and preferably, may include hard carbon in terms of further improving the hardness of the negative electrode active material.

The soft carbon may be formed by providing one or more materials selected from the group consisting of coal-tar pitch, rayon, and polyacrylonitrile-based resins or a precursor thereof on the surface of artificial graphite particle and then heat treating the same. The heat-treatment process for forming the carbon coating layer may be performed in a temperature range of 1,000° C. to 4,000° C. in terms of promoting the uniform formation of the coating layer.

The hard carbon may be formed by providing a carbon coating layer-forming material on the surface of the artificial graphite particle, and then heat treating the same.

The carbon coating layer-forming material may include a carbon-based material and a cross-linked polymer.

The carbon-based material may be formed by performing a first heat treatment on at least one selected from the group consisting of coke, petroleum-based pitch, and coal-based pitch, and preferably, may be formed by performing the first heat treatment on petroleum-based pitch.

The first heat treatment may be performed at a temperature of 830° C. to 1,220° C., and preferably 1,100° C. to 1,200° C. The carbon-based material formed by the first heat treatment in the temperature range described above may be formed of hard carbon having desired hardness and crystallinity at the time of forming the carbon coating layer, and thus the effect of improving high-temperature storage characteristics, lifespan characteristics, and rapid charging characteristics may be maximized.

The cross-linked polymer is a material that is subjected to the second heat treatment together with the carbon-based material to form hard carbon. Since the cross-linked polymer is subjected to the second heat treatment together with the carbon-based material, a uniform and stable carbon coating layer may be formed and hard carbon with a desired level of hardness and crystallinity may be formed.

The cross-linked polymer is not particularly limited, and may be, for example, one or more selected from the group consisting of polyacrylic acid, polyacrylonitrile, and polyimide, and preferably polyacrylic acid.

The carbon coating layer-forming material may include the carbon-based material and the cross-linked polymer at a weight ratio of 20:80 to 80:20, and preferably, 40:60 to 60:40. Within the above-described range, the desired level of hardness and crystallinity may be secured, and thus the structural stability of the active material may be improved, and the entry and exit of lithium ions may be facilitated to further improve rapid charging characteristics.

The second heat treatment on the artificial graphite particles and the carbon coating layer-forming material may be performed by further adding a binder for forming a carbon coating layer in addition to the above-described components. The binder for forming a carbon coating layer may serve to further facilitate the formation of the carbon coating layer by improving the cohesion or adhesion between the artificial graphite particles and the carbon coating layer-forming material.

The binder for forming a carbon coating layer is not particularly limited, and may be, for example, one or a mixture of two or more selected from the group consisting of a vinylidene fluoride-hexafluoropropylene copolymer, polyvinylidene fluoride, polyacrylonitrile, polymethyl methacrylate, polyvinyl alcohol, carboxymethyl cellulose, starch, hydroxypropyl cellulose, regenerated cellulose, polyvinylpyrrolidone, polytetrafluoroethylene, polyethylene, polypropylene, polyacrylic acid, an ethylene propylene diene monomer (EPDM), a sulfonated-EPDM, styrene-butadiene rubber and fluorocarbon rubber, and preferably, a vinylidene fluoride-hexafluoropropylene copolymer, polyvinylidene fluoride, or a mixture thereof.

The second heat treatment may be performed at a temperature of 1,000° C. to 3,000° C., and preferably 1,200° C. to 2,500° C. in terms of smooth formation of the carbon coating layer by the carbon coating layer-forming material.

The carbon coating layer may be included in an amount of 2 wt % to 6 wt %, and preferably, 3.5 wt % to 4.5 wt % with respect to 100 wt % of the negative electrode active material for a lithium secondary battery, and the above range is preferable in terms of reducing the charge transfer resistance of lithium ions and improving rolling performance.

The negative electrode active material for a lithium secondary battery may have an average particle size ($D_{50}$) of 13 µm to 25 µm, and preferably 15 µm to 20 µm. The above-described range is preferable in terms of realizing a battery having excellent rapid charging characteristics and excellent cycle characteristics.

The negative electrode active material for a lithium secondary battery may have a tap density of 0.84 g/cc to 1.2 g/cc, and preferably 0.9 g/cc to 1.05 g/cc. The tap density may be defined as an apparent density obtained by measuring the final volume obtained by vibrating a container a specific number of times after filling the container with the negative electrode active material. The above-described range of tap density may be preferable in terms of minimizing a diffusion path of lithium ions to improve rapid charging performance.

In an X-ray diffraction (XRD) analysis of the negative electrode active material for a lithium secondary battery, $L_c$, which is a crystallite size in a c-axis direction, may be in a range of 70 nm to 80 nm, and preferably 72 nm to 77 nm, and $L_a$, which is a crystallite size in an a-axis direction, may be in a range of 270 nm to 290 nm, and preferably 275 nm to 285 nm. The above-described ranges are preferable in terms of improving rapid charging performance because the active material particles may be arranged such that lithium ion diffusion is facilitated.

The negative electrode active material for a lithium secondary battery may have an aspect ratio of greater than 1 and less than or equal to 2, and preferably 1.2 to 1.8. The aspect ratio represents a ratio of the length of a major axis passing through the center of a negative electrode active material particle to the length of a minor axis perpendicular to the major axis and passing through the center of the particle, that is, a ratio of diameters (the length of the major axis/the length of the minor axis), and the shape may be spherical when the aspect ratio is "1" and the shape may be elliptical when the aspect ratio is greater than "1". When the negative electrode active material for a lithium secondary battery has the above-described range of aspect ratio, a space between active material particles may be effectively secured, so that a movement path of lithium ions may be sufficiently secured and simultaneously rapid charging performance may be improved.

The negative electrode active material for a lithium secondary battery may be included in an amount of 80 parts by weight to 99 parts by weight based on 100 parts by weight of the negative electrode active material layer.

The negative electrode active material layer may further include at least one additive selected from the group consisting of a binder, a thickener, and a conductive material in addition to the above-described negative electrode active material for a lithium secondary battery.

The binder is a component that assists bonding between a conductive material, an active material, and a current collector, and may be included in an amount of 1 part by weight to 30 parts by weight based on 100 parts by weight of the negative electrode active material layer.

The binder may include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an EPDM, a sulfonated-EPDM, styrene-butadiene rubber, fluorine rubber, or a combination of two or more thereof.

The thickener may be any thickener that can be used in a conventional lithium secondary battery, and is, for example, CMC.

The conductive material is a component for further improving the conductivity of a negative electrode active material and may be included in an amount of 1 part by weight to 30 parts by weight based on 100 parts by weight of the negative electrode active material layer.

The conductive material is not particularly limited as long as it does not cause a chemical change in a battery, and has conductivity, and may be, for example: graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorocarbon powder, aluminum powder, or nickel powder; a conductive whisker such as zinc oxide or potassium titanate; a conductive metal oxide such as titanium oxide; or a conductive material such as a polyphenylene derivative. Specific examples of commercially available conductive materials may include the acetylene black series (available from Chevron Chemical Company), Denka Black (available from Denka Singapore Private Limited), products from the Gulf Oil Company (available from Gulf Oil Company), Ketjen black, the EC series (available from Armak Company), Vulcan XC-72 (available from Cabot Company), Super P (available from Timcal Co., Ltd.), and the like.

The negative electrode active material layer may be prepared by mixing the above-described negative electrode active material for a lithium secondary battery and at least one additive selected from a binder, a conductive material, and a thickener in a solvent to prepare a negative electrode slurry, and applying the negative electrode slurry on the negative electrode current collector, followed by rolling and drying.

The solvent may include water or an organic solvent such as N-methyl-2-pyrrolidone (NMP), and may be used in an amount to have a preferable viscosity when the negative electrode active material, and selectively a binder and a conductive material are included. For example, the solvent may be included such that the concentration of the solid content including the negative electrode active material for a lithium secondary battery, and selectively the binder, the thickener, and the conductive material is in a range of 50 wt % to 95 wt %, and preferably 70 wt % to 90 wt %.

In an XRD analysis of the negative electrode for a lithium secondary battery, an orientation index for an area ratio I(004)/I(110) may be in a range of 3 to 11.5, preferably 3.5 to 6.5, and more preferably 3.5 to 5. Within the above-described range, the active material particles may be arranged such that the diffusion path of lithium ions may be minimized to contribute to achieving the above-described range of pore resistance, so that the effect of minimizing Li-plating during rapid charging may be more excellently realized.

The above-described range of orientation index may be realized, for example, by a method using an active material having a high hardness so that active material particles may be arranged to be vertically aligned, a method of randomly arranging crystallite directions of an active material, or the like.

A total pore volume of the negative electrode for a lithium secondary battery may be in a range of 7 $g/cm^3$ to 15 $g/cm^3$, and preferably 7.5 $g/cm^3$ to 10 $g/cm^3$. Within the above-described range, a sufficient level of pores may be secured to allow lithium ions to smoothly enter and exit, so that rapid charging performance may be further improved, thereby preventing Li-plating problem which may occur during rapid charging. The total pore volume may be measured, for example, by a method of measuring a total pore volume according to Barrett-Joyner-Halenda (BJH) theory in measuring the specific surface area of a negative electrode using a Brunauer-Emmett-Teller (BET) measuring instrument.

Lithium Secondary Battery

Further, the present invention provides a lithium secondary battery including the above-described negative electrode for a lithium secondary battery.

The lithium secondary battery may include the above-described negative electrode for a lithium secondary battery, a positive electrode for a lithium secondary battery, and a separator interposed between the negative electrode for a lithium secondary battery and the positive electrode for a lithium secondary battery.

Specifically, the lithium secondary battery of the present invention may be manufactured by injecting a non-aqueous electrolyte solution of the present invention into an electrode structure consisting of a positive electrode for a lithium secondary battery, a negative electrode for a lithium secondary battery, and a separator interposed between the positive electrode for a lithium secondary battery and the negative electrode for a lithium secondary battery. Here, the positive electrode, the negative electrode and the separator constituting the electrode structure may be those generally used in the manufacture of a lithium secondary battery.

Here, the positive electrode may be manufactured by coating a positive electrode current collector with a positive electrode active material slurry including a positive electrode active material and selectively a binder, a conductive material, and a solvent, followed by drying and rolling.

The positive electrode current collector is not particularly limited as long as it has conductivity without causing chemical changes in the battery, and for example, stainless steel, aluminum, nickel, titanium, calcined carbon, or aluminum or stainless steel whose surface is treated with carbon, nickel, titanium or silver may be used.

The positive electrode active material is a compound enabling reversible intercalation and deintercalation of lithium, which may specifically include a lithium composite metal oxide including lithium and one or more types of metals selected from cobalt, manganese, nickel, and aluminum. More specifically, the lithium composite metal oxide may be a lithium-manganese-based oxide (e.g., $LiMnO_2$, $LiMn_2O_4$, and the like), a lithium-cobalt-based oxide (e.g., $LiCoO_2$ and the like), a lithium-nickel-based oxide (e.g., $LiNiO_2$ and the like), a lithium-nickel-manganese-based oxide (e.g., $LiNi_{1-Y}Mn_YO_2$ (where $0<Y<1$), $LiMn_{2-Z}Ni_ZO_4$ (where $0<Z<2$), and the like), a lithium-nickel-cobalt-based oxide (e.g., $LiNi_{1-Y1}Co_{Y1}O_2$ (where $0<Y1<1$) and the like), a lithium-manganese-cobalt-based oxide (e.g., $LiCo_{1-Y2}Mn_{Y2}O_2$ (where $0<Y2<1$), $LiMn_{2-z1}Co_{z1}O_4$ (where $0<Z<2$), and the like), a lithium-nickel-manganese-cobalt-based oxide (e.g., $Li(Ni_pCo_qMn_{r1})O_2$ (where $0<p<1$, $0<q<1$, $0<r1<1$, $p+q+r1=1$) or $Li(Ni_{p1}Co_{q1}Mn_2)O_4$ (where $0<p1<2$, $0<q1<2$, $0<r2<2$, $p1+q1+r2=2$) and the like), or a lithium-nickel-cobalt-transition metal (M) oxide (e.g., $Li(Ni_{p2}Co_{q2}Mn_{r3}Ms_2)O_2$ (where M is selected from the group consisting of Al, Fe, V, Cr, Ti, Ta, Mg and Mo, each of p2, q2, r3 and s2 is the atomic fraction of elements which are independent of one another, and $0<p2<1$, $0<q2<1$, $0<r3<1$, $0<s2<1$, $p2+q2+r3+s2=1$) and the like), which may be used alone or in a mixture of two or more thereof. Among these, in terms of improving the capacity characteristics and stability of a battery, the lithium composite metal oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.8}Mn_{0.1}Co_{0.1})O_2$, and the like), or a lithium nickel-cobalt-aluminum oxide (e.g., $Li(Ni_{0.8}Co_{0.15}Al_{0.05})O_2$ and the like), and in consideration of significant improvement caused by control of the type and content ratio of constituent elements for forming a lithium composite metal oxide, the lithium composite metal oxide may be $Li(Ni_{0.6}Mn_{0.2}Co_{0.2})O_2$, $Li(Ni_{0.7}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, which may be used alone or in a mixture of two or more thereof.

The positive electrode active material may be included in an amount of 80 wt % to 99 wt % based on the total weight of a positive electrode mixture.

The binder is a component that assists bonding between an active material and a conductive material and binding to a current collector, and is commonly added in an amount of 1 wt % to 30 wt % based on the total weight of the positive electrode mixture. Examples of such a binder may include polyvinylidene fluoride, polyvinyl alcohol, CMC, starch, hydroxypropyl cellulose, regenerated cellulose, polyvinylpyrrolidone, polytetrafluoroethylene, polyethylene, polypropylene, an EPDM, a sulfonated-EPDM, styrene-butadiene rubber, fluorine rubber, various copolymers, and the like.

The conductive material is commonly added in an amount of 1 wt % to 30 wt % based on the total weight of the positive electrode mixture.

Such a conductive material is not particularly limited as long as it imparts conductivity without causing chemical changes in the battery, and may be, for example: graphite; a carbon-based material such as carbon black, acetylene black, Ketjen black, channel black, furnace black, lamp black or thermal black; a conductive fiber such as a carbon fiber or a metal fiber; metal powder such as fluorocarbon powder, aluminum powder, or nickel powder; a conductive whisker consisting of zinc oxide or potassium titanate; a conductive metal oxide such as titanium oxide; or a conductive polymer such as a polyphenylene derivative or the like. Specific examples of commercially available conductive materials may include the acetylene black series (available from Chevron Chemical Company), Denka Black (available from Denka Singapore Private Limited), products from the Gulf Oil Company (available from Gulf Oil Company), Ketjen black, the EC series (available from Armak Company), Vulcan XC-72 (available from Cabot Company), Super P (available from Timcal Co., Ltd.), and the like.

The solvent may be an organic solvent such as N-methyl-2-pyrrolidone (NMP), and may be used in an amount to have a preferable viscosity when the positive electrode active material, and selectively a binder and a conductive material are included. For example, the solvent may be included such that the concentration of a solid content including a positive electrode active material, and selectively a binder and a conductive material is in a range of 50 wt % to 95 wt %, and preferably 70 wt % to 90 wt %.

In the lithium secondary battery, the separator separates a negative electrode from a positive electrode and provides a movement path for lithium ions, and is not particularly limited as long as it can be used as a separator in a general lithium secondary battery, and particularly, has low resistance to ion mobility of an electrolyte and an excellent electrolyte impregnation ability. Specifically, a porous polymer film, for example, a porous polymer film formed of a polyolefin-based polymer such as an ethylene homopolymer, a propylene homopolymer, an ethylene/butene copolymer, an ethylene/hexene copolymer and an ethylene/methacrylate copolymer, or a stacked structure having two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

Further, as the electrolyte used in the present invention, an organic liquid electrolyte, an inorganic liquid electrolyte, a solid polymer electrolyte, a gel-type polymer electrolyte, a solid inorganic electrolyte, or a molten inorganic electrolyte, which may be used in manufacturing a lithium secondary battery, may be used, but the present invention is not limited thereto.

Specifically, the electrolyte may include an organic solvent and a lithium salt.

The organic solvent is not particularly limited as long as it can serve as a medium enabling the movement of ions involved in an electrochemical reaction of a battery. Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bond, aromatic ring or an ether bond); an amide-based solvent such as dimethylformamide; a dioxolane-based solvent such as 1,3-dioxolane; or a sulfolane-based solvent may be used. Among these, a carbonate-based solvent is preferably used, and a mixture of a cyclic carbonate having high ionic conductivity and a high dielectric constant, such as ethylene carbonate or propylene carbonate, which can increase the charge and discharge performance of the battery, and a linear carbonate-based compound with low viscosity (for example, ethyl methyl carbonate, dimethyl carbonate, diethyl carbonate, etc.) is more preferably used. In this case, when a cyclic carbonate and a chain-type carbonate are mixed in a volume ratio of about 1:1 to about 1:9, the electrolyte solution may exhibit excellent performance.

The lithium salt is not particularly limited as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used as the lithium salt. The concentration of the lithium salt is preferably in a range of 0.1 to 2.0M. When the concentration of the lithium salt is in the above-described range, the electrolyte has suitable conductivity and viscosity and thus may exhibit excellent electrolyte performance, and the lithium ions may effectively move.

As described above, since the lithium secondary battery according to the present invention stably exhibits excellent discharge capacity, rapid charging characteristics and an excellent capacity retention rate, the lithium secondary battery is useful in the field of portable devices such as a mobile phone, a notebook computer, a digital camera, and the like, and an electric vehicle field including a hybrid electric vehicle (HEV), and particularly, is preferably used as a constituent battery for medium-to-large battery modules. Accordingly, the present invention also provides a medium-to-large battery module including the above-described secondary battery as a unit battery.

Such a medium-to-large battery module is preferably applied to a power source requiring a high output and a large capacity, for example, an electric vehicle, an HEV, or a power storage device.

Hereinafter, examples of the present invention will be described in detail so that those of ordinary skill in the art can easily carry out the present invention. However, the present invention may be embodied in various different forms and is not limited to the examples described below.

Examples 1 to 5 and Comparative Examples 1 to 6

Negative electrodes for a lithium secondary battery of Examples 1 to 5 and Comparative Examples 1 to 6 were manufactured by the following method. First, different negative electrode active materials having the characteristics shown in Table 1 were prepared, and the negative electrode active material, Super C65 as a conductive material, styrene-butadiene rubber (SBR) as a binder, and CMC as a thickener were mixed in a weight ratio of 95.6:1:2.3:1.1, respectively, and water was added to prepare a negative electrode slurry.

Subsequently, each of the negative electrodes for a lithium secondary battery of the Examples and Comparative Examples was manufactured by applying the negative electrode slurry on a copper foil to a thickness of 65 μm, and performing vacuum drying at about 130° C. for eight hours, followed by rolling. Here, the loading of the negative electrode was manufactured to be 3.61 mAh/cm².

Table 1 below shows the average particle size ($D_{50}$), hardness, tap density, crystallite size of each of the negative electrode active materials for a lithium secondary battery of Examples 1 to 5 and Comparative Examples 1 to 6, and also shows an orientation index for an area ratio I(004)/I(110) and total pore volume in XRD analysis of each of the negative electrodes for a lithium secondary battery of Examples 1 to 5 and Comparative Examples 1 to 6.

TABLE 1

| | | Examples | | | | | Comparative Examples |
|---|---|---|---|---|---|---|---|
| Classification | | 1 | 2 | 3 | 4 | 5 | 1 |
| Negative electrode active material | Particle type | Artificial graphite particles | Artificial graphite particles | Artificial graphite particles | Artificial graphite particles | Artificial graphite particles | Artificial graphite particles |
| | Average particle size ($D_{50}$)(μm) | 15 | 15 | 15 | 15 | 15 | 15 |
| | Hardness (MPa) | 60 | 50 | 50 | 60 | 50 | 40 |
| | Tap density (g/cc) | 1.01 | 0.97 | 0.98 | 0.85 | 0.88 | 0.83 |
| Crystallite size | $L_a$ | 280 | 279 | 278 | 275 | 276 | 274 |
| | $L_c$ | 75 | 73 | 72 | 70 | 71 | 72 |

TABLE 1-continued

| | | | | | | | |
|---|---|---|---|---|---|---|---|
| Negative electrode | Orientation index (I(004)/I(110)) | 4 | 4 | 6 | 11 | 7 | 13 |
| | Total pore volume (g/cm³) | 8 | 9 | 10 | 15 | 12 | 16 |

| | | Comparative Examples | | | | |
|---|---|---|---|---|---|---|
| Classification | | 2 | 3 | 4 | 5 | 6 |
| Negative electrode active material | Particle type | Artificial graphite particles | Natural graphite particles | Natural graphite particles | Artificial graphite particles | Artificial graphite particles |
| | Average particle size (D₅₀)(μm) | 15 | 15 | 15 | 15 | 15 |
| | Hardness (MPa) | 30 | 35 | 25 | 60 | 40 |
| | Tap density (g/cc) | 0.82 | 0.95 | 0.98 | 0.78 | 0.80 |
| | Crystallite size $L_a$ | 293 | 279 | 298 | 265 | 260 |
| | Crystallite size $L_c$ | 88 | 71 | 91 | 68 | 63 |
| Negative electrode | Orientation index (I(004)/I(110)) | 19 | 14 | 25 | 13 | 6 |
| | Total pore volume (g/cm³) | 22 | 16 | 30 | 17 | 19 |

The hardness, the tap density, the crystallite size, the orientation index, and the total pore volume were measured by the following methods.

(1) Hardness

The hardness of each of the negative electrode active materials for a lithium secondary battery of the Examples and Comparative Examples was measured using a powder resistivity meter (device name: Powder Resistivity Measurement System, manufacturer: HAN TECH Co.).

(2) Tap Density

The tap density was determined by measuring an apparent density obtained by measuring the final volume obtained by filling 40 g of each of the negative electrode active materials for a lithium secondary battery used in the Examples and Comparative Examples into a container and vibrating the container up and down about 1000 times.

(3) Crystallite Size

The crystallite size was determined by performing an XRD analysis on each of the negative electrode active materials for a lithium secondary battery used in the Examples and Comparative Examples, and calculating $L_c$, which is a crystallite size of a particle in a c-axis direction, and $L_a$, which is a crystallite size of the particle in an a-axis direction, using the Scherrer equation of Equations 1 and 2 below.

$$L_c = \frac{K\lambda}{\beta_{(2\theta)}\cos\theta} \text{ where } K = \text{Scherrer constant } (K = 0.9) \quad \text{[Equation 1]}$$

$\beta$ = half width
$\lambda$ = wavelength (0.154056 nm)
$\theta$ = angle at maximum peak.

$$L_a = \frac{K\lambda}{\beta_{(2\theta)}\cos\theta} \text{ where } K = \text{Scherrer constant } (K = 1.84) \quad \text{[Equation 2]}$$

$\beta$ = half width
$\lambda$ = wavelength (0.154056 nm)
$\theta$ = angle at maximum peak.

(3) Orientation Index

The orientation index of each of the negative electrodes for a lithium secondary battery of the Examples and Comparative Examples was obtained from an area ratio I(002)/I(110) obtained by measuring a (002) plane and a (110) plane by XRD and integrating each measured XRD peak.

(4) Total Pore Volume

The total pore volume of each of the negative electrodes for a lithium secondary battery of the Examples and Comparative Examples was measured by a method of measuring a total pore volume according to BJH theory in measuring the specific surface area of a negative electrode using a BET measuring instrument (device name: BELSORP., manufacturer: BEL Japan).

Experimental Example 1: Measurement of Pore Resistance $R_p$

Each of the negative electrodes for a lithium secondary battery manufactured in Examples 1 to 5 and Comparative Examples 1 to 6 was commonly used as a working electrode and a counter electrode, and a polyethylene separator was interposed between the working electrode and the counter electrode to manufacture an electrode assembly. An electrolyte solution in which 1M LiPF₆ was dissolved in a solvent in which ethylene carbonate (EC) and ethyl methyl carbonate (EMC) were mixed at a volume ratio of 1:4 was injected into the electrode assembly to manufacture a symmetric cell.

The impedance of the symmetric cell was measured using an electrochemical impedance analyzer with a frequency range of $10^6$ Hz to 0.05 Hz, and the pore resistance $R_p$ was measured after separating the electrolyte solution resistance and the pore resistance. The results are shown in Table 2 below.

TABLE 2

| | Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| Pore resistance (Ω) | 4 | 4.5 | 5 | 5.6 | 6 | 7.5 | 8.9 | 11.3 | 12.1 | 6.4 | 6.8 |

Experimental Example 2: Evaluation of Rapid Charging Characteristics

Li-plating experiments were performed in the present Experimental Example to confirm the rapid charging characteristics of each of the negative electrodes for a lithium secondary battery manufactured in Examples 1 to 5 and Comparative Examples 1 to 6.

First, the negative electrode for a lithium secondary battery manufactured as described above was punched into a coin cell size, a polyolefin separator was interposed between a lithium metal foil as a counter electrode and the coin cell-sized negative electrode, and then an electrolyte solution in which 1M LiPF$_6$ was dissolved in a solvent in which ethylene carbonate (EC) and ethyl methyl carbonate (EMC) were mixed at a volume ratio of 50:50 was injected to manufacture coin-type half cells of the Examples and the Comparative Examples.

Thereafter, the coin-type half cells of the Examples and the Comparative Examples were charged and discharged at 1C for 3 cycles, followed by charging at 3C for 15 minutes to determine the inflection point of the first derivative, dQ/dV, of the profile, and a Li-plating state of charge (SOC) (%), which is the SOC at the time when Li-plating occurred on the surface of the negative electrode, was quantified. The results are shown in Table 3.

TABLE 3

| Classification | Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| Li-plating SOC(%) | 50 | 48 | 46 | 43 | 41 | 28 | 24 | 21 | 19 | 34 | 31 | an aluminum foil was coated with the positive electrode slurry with a thickness of 12 μm, vacuum dried at about 130° C. for 8 hours and rolled to manufacture a positive electrode. Here, the loading of the positive electrode was manufactured to be 4.10 mAh/cm$^2$.

A polyolefin separator was interposed between each of the negative electrodes manufactured in Examples 1 to 5 and Comparative Examples 1 to 6 and the positive electrode, and an electrolyte solution in which 1M LiPF$_6$ was dissolved in a non-aqueous electrolyte solution solvent in which ethylene carbonate (EC) and ethyl methyl carbonate (EMC) were mixed at a volume ratio of 2:8 was injected to manufacture a coin cell type lithium secondary battery.

The lithium secondary batteries manufactured above were subjected to charging/discharging for 300 cycles at 45° C. and 1C/C, the charge capacity retention rate (%) at 300 cycles and the discharge capacity retention rate (%) at 300 cycles were calculated according to Equations 3 and 4 below, the results of which are shown in Table 4 below.

Charge capacity retention rate (%) at 300 cycles=Charge capacity of lithium secondary battery at 300th cycle/Charge capacity of lithium secondary battery at first cycle×100   [Equation 3]

Discharge capacity retention rate (%) at 300 cycles=Discharge capacity of lithium secondary battery at 300th cycle/discharge capacity of lithium secondary battery at first cycle×100   [Equation 4]

TABLE 4

| | Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| Charge capacity retention rate at 300th cycle (%) | 90.8 | 90.4 | 90.1 | 88.5 | 87.4 | 78.3 | 78.0 | 75.6 | 74.3 | 80.1 | 79.8 |
| Discharge capacity retention rate at 300th cycle (%) | 90.5 | 90.1 | 89.8 | 88.2 | 87.1 | 79.8 | 78.0 | 77.7 | 74.0 | 71.8 | 71.5 |

Referring to Table 3, it can be seen that in the case of the negative electrodes for a lithium secondary battery of the Examples having a pore resistance $R_p$ of 6Ω or less and including artificial graphite particles, the rapid charging performance is remarkably excellent compared to the Comparative Examples.

Experimental Example 3: Evaluation of Cycle Characteristics

<Manufacture of Lithium Secondary Battery>

LiNi$_{0.6}$Co$_{0.2}$Mn$_{0.2}$O$_2$ as an active material, Li-435 (produced by Denka Corporation) as a conductive material, a mixture including KF9700 (produced by Kureha Corporation) and BM-730H (produced by Zeon Corporation) at a weight ratio of 90:10 as a binder, and Daicel 2200 (produced by Daicel Corporation) as a thickener were mixed at a weight ratio of 96.25:1.0:1.5:1.25, and water was added thereto to prepare a positive electrode slurry. Subsequently, Referring to Table 4, it can be seen that the negative electrodes for a lithium secondary battery of the Examples having a pore resistance $R_p$ of 6Ω or less and including artificial graphite particles have a sufficient diffusion path of lithium, so that the charge and discharge capacity retention rates are high, and thus cycle characteristics are excellent.

The invention claimed is:

1. A negative electrode for a lithium secondary battery comprising:
   a negative electrode current collector; and
   a negative electrode active material layer formed on at least one surface of the negative electrode current collector,
   wherein the negative electrode active material layer comprises a negative electrode active material comprising an artificial graphite particle,
   wherein a pore resistance of the negative electrode, $R_p$, is 6Ω or less, wherein the pore resistance of the negative electrode measured by performing electrochemical impedance spectroscopy (EIS) to a symmetric cell comprising the negative electrode as a working electrode and a counter electrode in a frequency range of $10^6$ Hz to 0.05Hz using 1 M $LiPF_6$ dissolved in a solvent containing ethylene carbonate and ethyl methyl carbonate at a volume ratio of 1:4 as an electrolyte solution and separating the electrolyte solution resistance and the pore resistance, wherein the negative electrode active material has a crystallite size along an a-axis ($L_a$) of 270 nm to 290 nm and a crystallite size along a c-axis ($L_c$) of 70 nm to 80 nm, and wherein La and Lc are measured by X-ray diffraction (XRD).

2. The negative electrode for a lithium secondary battery of claim 1, wherein the pore resistance of the negative electrode, $R_p$, is in a range of 3Ω to 6Ω.

3. The negative electrode for a lithium secondary battery of claim 1, wherein the artificial graphite particle has a hardness of 46 MPa or more.

4. The negative electrode for a lithium secondary battery of claim 1, wherein the artificial graphite particle is a secondary artificial graphite particle formed by agglomerating two or more primary artificial graphite particles.

5. The negative electrode for a lithium secondary battery of claim 1, wherein the negative electrode active material further comprises a carbon coating layer formed on the artificial graphite particle.

6. The negative electrode for a lithium secondary battery of claim 5, wherein the carbon coating layer comprises at least one selected from the group consisting of hard carbon and soft carbon.

7. The negative electrode for a lithium secondary battery of claim 5, wherein the carbon coating layer is present in an amount of 2 wt % to 6 wt % based on 100 wt % of the negative electrode active material.

8. The negative electrode for a lithium secondary battery of claim 1, wherein a tap density of the negative electrode active material is in a range of 0.84 g/cc to 1.2 g/cc.

9. The negative electrode for a lithium secondary battery of claim 1, wherein an orientation index of the negative electrode for an area ratio I(004)/I(110) in an X-ray diffraction analysis is in a range of 3 to 11.5.

10. The negative electrode for a lithium secondary battery of claim 1, wherein a total pore volume of the negative electrode is in a range of 7 g/cm$^3$ to 15 g/cm$^3$.

11. A lithium secondary battery comprising the negative electrode for a lithium secondary battery of claim 1.

* * * * *